(12) United States Patent
Brooks et al.

(10) Patent No.: US 10,662,113 B2
(45) Date of Patent: *May 26, 2020

(54) FIRE-RESISTANT CALCIUM SULPHATE-BASED PRODUCTS

(71) Applicant: SAINT-GOBAIN PLACO, Suresnes (FR)

(72) Inventors: Laura Brooks, Loughborough (GB); Robin Fisher, Loughborough (GB); Jan Rideout, Loughborough (GB)

(73) Assignee: SAINT-GOBAIN PLACO, Suresnes (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/525,467

(22) PCT Filed: Nov. 17, 2015

(86) PCT No.: PCT/EP2015/076785
§ 371 (c)(1),
(2) Date: May 9, 2017

(87) PCT Pub. No.: WO2016/079098
PCT Pub. Date: May 26, 2016

(65) Prior Publication Data
US 2017/0334783 A1    Nov. 23, 2017

(30) Foreign Application Priority Data

Nov. 21, 2014  (GB) .................................. 1420766.6

(51) Int. Cl.
| | | |
|---|---|---|
| *C04B 28/14* | (2006.01) | |
| *C04B 22/08* | (2006.01) | |
| *C04B 24/42* | (2006.01) | |
| *C04B 111/28* | (2006.01) | |
| *C04B 111/34* | (2006.01) | |

(52) U.S. Cl.
CPC ............ *C04B 28/14* (2013.01); *C04B 22/085* (2013.01); *C04B 24/42* (2013.01); *C04B 2111/28* (2013.01); *C04B 2111/34* (2013.01); *Y02W 30/92* (2015.05); *Y02W 30/94* (2015.05)

(58) Field of Classification Search
CPC ..... C04B 11/00; C04B 11/002; C04B 11/005; C04B 22/10; C04B 22/085; C04B 22/124; C04B 24/42; C04B 28/14; C04B 28/16; C04B 2111/28; C04B 2111/34; Y02W 30/92; Y02W 30/94
See application file for complete search history.

(56) References Cited

U.S. PATENT DOCUMENTS

| | | | |
|---|---|---|---|
| 2,526,066 A | 10/1950 | Croce | |
| 2,744,022 A | 5/1956 | Croce et al. | |
| 3,616,173 A | 10/1971 | Green et al. | |
| 3,782,992 A | 1/1974 | Uchikawa et al. | |
| 3,980,487 A * | 9/1976 | Akabayashi | C04B 24/14 106/648 |
| 4,664,707 A | 5/1987 | Wilson et al. | |
| 4,722,866 A | 2/1988 | Wilson et al. | |
| 5,346,550 A | 9/1994 | Kunzi et al. | |
| 5,985,013 A | 11/1999 | Kofler et al. | |
| 6,013,125 A | 1/2000 | Quraishi et al. | |
| 6,475,275 B1 | 11/2002 | Nebesnak et al. | |
| 6,569,541 B1 | 5/2003 | Martin et al. | |
| 7,101,430 B1 | 9/2006 | Pike et al. | |
| 8,016,960 B2 | 9/2011 | Wittbold et al. | |
| 2003/0138614 A1 | 7/2003 | Leclercq | |
| 2004/0092614 A1* | 5/2004 | Hilton | B28C 5/388 521/82 |
| 2010/0071597 A1 | 3/2010 | Perez-Pena | |
| 2010/0136259 A1 | 6/2010 | O'Keefe et al. | |
| 2011/0195241 A1 | 8/2011 | Yu et al. | |
| 2013/0199418 A1* | 8/2013 | Yamashita | C04B 28/145 106/781 |
| 2014/0121303 A1* | 5/2014 | Hagen | C04B 20/10 524/5 |
| 2014/0371352 A1* | 12/2014 | Dantin | C04B 28/02 524/5 |

FOREIGN PATENT DOCUMENTS

| | | |
|---|---|---|
| CN | 1071156 A | 4/1993 |
| CN | 1443146 A | 9/2003 |
| CN | 101265067 A * | 9/2008 |

(Continued)

OTHER PUBLICATIONS

May 7, 2015 Search Report issued in Great Britain Patent Application No. GB1420766.6.
Feb. 10, 2016 Search Report issued in International Patent Application No. PCT/EP2015/076785.
Feb. 10, 2016 Written Opinion issued in International Patent Application No. PCT/EP2015/076785.
May 23, 2017 International Preliminary Report on Patentability issued in International Patent Application No. PCT/EP2015/076785.

(Continued)

*Primary Examiner* — Anthony J Green
(74) *Attorney, Agent, or Firm* — Oliff PLC

(57) ABSTRACT

The present invention provides calcium sulphate-based product having reduced shrinkage after exposure to high temperatures, the product comprising gypsum, a pozzolan source (e.g. in an amount between 4-27 wt %) and a metal salt additive (in an amount between 0.5 and 10 wt %). The pozzolan source may be selected from a kaolinitic clay material, fly ash, rice husk ash, diatomaceous earths, volcanic ashes and pumices, micro-silica, silica fume and silicone oil. The metal salt additive may be a metal salt which decomposes between a temperature of 300-500° C. to yield a metal oxide, e.g. magnesium nitrate.

19 Claims, No Drawings

(56) References Cited

FOREIGN PATENT DOCUMENTS

| | | | |
|---|---|---|---|
| CN | 102173726 | A | 9/2011 |
| CN | 102826823 | A | 12/2012 |
| CN | 102850031 | A | 1/2013 |
| CN | 102464478 | B | 2/2014 |
| CN | 103626439 | A | 3/2014 |
| CN | 103803821 | A | 5/2014 |
| CN | 103979837 | A | 8/2014 |
| CN | 104016649 | A | 9/2014 |
| CN | 104058644 | A | 9/2014 |
| EP | 0258064 | A3 | 10/1989 |
| EP | 1 081 113 | A1 | 3/2001 |
| EP | 2 502 891 | A1 | 9/2012 |
| JP | S55-126559 | A | 9/1980 |
| JP | S57-71841 | A | 5/1982 |
| JP | H042640 | A | 1/1992 |
| JP | H05-97487 | A | 4/1993 |
| JP | H07-133147 | A | 5/1995 |
| JP | H10-245256 | A | 9/1998 |
| JP | 2986986 | B2 | 12/1999 |
| JP | 2005-187278 | A | 7/2005 |
| JP | 2009-263217 | A | 11/2009 |
| KR | 100835702 | B1 | 6/2008 |
| RU | 2260572 | C1 | 9/2005 |
| RU | 2285677 | C1 | 10/2006 |
| RU | 2383410 | C1 | 3/2010 |
| RU | 2387607 | C2 | 4/2010 |
| SU | 1629269 | A1 * | 2/1991 ............ C04B 28/08 |
| WO | 99/08979 | A1 | 2/1999 |
| WO | 00/06518 | A1 | 2/2000 |
| WO | 2012/116313 | A1 | 8/2012 |
| WO | 2013048351 | A1 | 4/2013 |
| WO | 2013-098859 | A1 | 7/2013 |

OTHER PUBLICATIONS

Aug. 14, 2018 Office Action issued in U.S. Appl. No. 15/525,523.
Nov. 30, 2018 Office Action issued in U.S. Appl. No. 15/525,523.
Mar. 25, 2019 Office Action issued in U.S. Appl. No. 15/525,523.
May 5, 2019 Office Action issued in Chinese Patent Application No. 201580062495.3.
Feb. 10, 2016 Search Report issued in International Patent Application No. PCT/EP2015/076787.
Feb. 10, 2016 Written Opinion issued in International Patent Application No. PCT/EP2015/076787.
May 7, 2015 Search Report issued in British Patent Application No. 1420767.4.
Mar. 18, 2019 Office Action issued in Chinese Patent Application No. 201580062741.5.
Apr. 20, 2019 Search Report issued in Russian Patent Application No. 2017121655/03.
May 23, 2017 International Preliminary Report on Patentability issued in International Patent Application No. PCT/EP2015/076786.
Feb. 1, 2019 Examination Report issued in European Patent Application No. 15 794 947.0.
Aug. 15, 2018 Examination Report issued in European Patent Application No. 15 794 947.0.
Yen, Chen, "6. Additives that reduce the tendency to shrink and crack," Gypsum building materials (second edition), China Building Materials Industry Press, 2012, pp. 283-285, ISBN 978-7-80227-549-2.
Feb. 17, 2016 International Search Report issued with International Patent Application No. PCT/EP2015/076786.
Feb. 17, 2016 Written Opinion issued with International Patent Application No. PCT/EP2015/076786.
May 5, 2019 Office Action issued in Chinese Patent Application No. 201580062107.1.
Sep. 9, 2019 Office Action issued in Russian Patent Application No. 2017121655.
May 7, 2015 Search Report issued in British Patent Application No. 1420768.2.
Sep. 12, 2019 English Translation of Office Action issued in Japanese Patent Application No. 2017-527560.
Jan. 27, 2020 Office Action issued in U.S. Appl. No. 15/524,956.
Lewis, Sr., Hawley's Condensed Chemical Dictionary, Twelfth Edition, p. 42, 1993.

* cited by examiner

FIRE-RESISTANT CALCIUM SULPHATE-BASED PRODUCTS

This invention relates to improved fire resistant calcium sulphate-based products and, in particular, to calcium sulphate-based building/construction products having reduced shrinkage after exposure to high temperatures.

BACKGROUND

Calcium sulphate-based products are widely used in the construction of buildings, for example, to form internal partitions (using wallboard, also known as dry wall, gypsum board or plaster board) and ceilings or to encase ducts (e.g. ventilation ducts) within buildings.

Calcium sulphate-based products such as wallboard are typically formed by drying an aqueous slurry of the hemihydrate of calcium sulphate ($CaSO_4 \cdot \frac{1}{2}H_2O$), also known as calcined gypsum or stucco, between two sheets of lining paper or fibreglass matting. As the slurry dries and the calcined gypsum is hydrated, a hard, rigid core of gypsum (calcium sulphate dihydrate—($CaSO_4 \cdot 2H_2O$)) sandwiched between the lining sheets/mats is formed.

When wallboard is exposed to high temperatures such as those experienced in a building fire, or those experienced by wallboards used for encasing ducts carrying high temperature fluids, the water of crystallization contained within the gypsum is driven off to yield the anhydrite of calcium sulphate. Initially, this has the advantage that heat transfer across the wallboard is reduced thus helping to contain the heat emanating from a duct or generated during a building fire. However, at temperatures around 400-450° C., the initially formed AIII phase anhydrite (also known as $\gamma$-$CaSO_4$ or "soluble" anhydrite) converts to the AII phase (or "insoluble" anhydrite) and this phase change results in shrinkage of the wallboard i.e. a loss of dimensional stability. This shrinkage (which may be around 2% of the wallboard's length or width or around 6 vol %) often causes the wallboards to pull away from their supporting structures. This is obviously undesirable. In situations where wallboard is used for internal partitions and a fire breaks out, shrinkage can leaves gaps exposing rooms adjacent to the fire source to the effects of the heat/fire. Gaps also allow ingress of oxygen into the fire source thus fuelling the fire and negating the effects of any fire doors.

At higher temperatures (in excess of 600° C.), the insoluble anhydrite goes on to sinter resulting in large reductions in wallboard volume. This results in extreme shrinkage which eventually causes collapse of the internal walls/ceilings/duct casings as they are no longer held by their supporting structures.

Efforts have been made to improve the fire resistance of calcium sulphate-based products in an attempt to reduce shrinkage after exposure to high temperatures.

It is known e.g. from U.S. Pat. Nos. 2,526,066 and 2,744,022, to add a combination of unexpanded vermiculite and non-combustible fibres to the aqueous calcined gypsum slurry during the manufacture of wallboard.

During heat exposure the vermiculite contained within the wallboard core expands by an amount comparable to the amount of gypsum shrinkage thus resisting the shrinkage of the wallboard.

Wallboard containing unexpanded vermiculite and/or glass fibres has found extensive commercial excess.

U.S. Pat. No. 3,616,173 proposed adding small amounts (preferably about 2-5 wt %) of clay, colloidal silica or colloidal alumina to the gypsum core in addition to the glass fibres and vermiculite. The intention was to reduce the density of the fire resistant wallboard. Amounts greater than 20 wt % were found to result in a weak core that did not bind satisfactorily with the paper lining sheets.

US2003/0138614 discloses a fire resistant gypsum wallboard containing, in addition to unexpended vermiculite and glass fibres, 3-25 wt % of a mineral additive which may be a clay and 3-15 wt % hydrated alumina. Best results were achieved using 10-15 wt % of a clay comprising 25% kaolinite.

U.S. Pat. No. 4,664,707 discloses a gypsum wall board made from a slurry containing glass fibres, calcium sulphate crystal fibres and 0.5-5 wt % clay, preferably a kaolinitic clay.

U.S. Pat. No. 6,569,541 discloses a water-resistant gypsum wallboard containing 5-15 wt % of a mineral additive which may be a clay such as kaolinite.

U.S. Pat. No. 5,985,013 discloses an ablative type heat protecting material containing calcium sulphate hemihydrate and a hydrated salt. A number of hydrated salts are used including magnesium nitrate hexahydrate (used in an amount of 40 wt % based on the weight of dry ingredients). The time taken for heat transfer across the heat ablative material was recorded. No mention is made of any effect on the shrinkage of the material after heating.

Calcium sulphate-based products are also used to cast metal or glass objects. Calcium sulphate moulds are heated to 700-900° C. prior to being filled with molten metal/glass. It is important to control high temperature shrinkage of such calcium sulphate-based moulds to ensure that the moulds do not leak and to ensure that the cast metal/glass products are not warped.

A preferred aim of the present invention is to provide an improved fire/heat resistant calcium-sulphate-based product having reduced shrinkage after heat exposure e.g. during a building fire. Such an improved fire resistant product may have particular use as a building product e.g. wallboard or panels for forming internal partitions in buildings, ceiling tiles, wallboard or panels for encasing ventilation/smoke extraction ducting, joint filler materials for joining wallboard/panels/tiles or for moulds for use in metal/glass product casting.

SUMMARY OF THE INVENTION

Accordingly, in a first aspect, the present invention provides a calcium sulphate-based product comprising gypsum, a pozzolan source and a metal salt additive.

In a second aspect, the present invention provides a calcium sulphate-based product wherein the product is formed from drying an aqueous slurry containing calcined gypsum, a pozzolan source and a metal salt additive.

In a third aspect, the present invention provides a method of forming a calcium sulphate-based product by drying an aqueous slurry comprising calcined gypsum, a pozzolan source and a metal salt.

In a fourth aspect, the present invention provides the use of a combination of a pozzolan source and a metal salt additive for reducing shrinkage during heat exposure of a calcium sulphate-based product.

In a fifth aspect, the present invention provides a calcium sulphate-based composition for use in forming a calcium sulphate-based product by drying an aqueous slurry of the calcium sulphate-based composition, the calcium sulphate-based composition comprising calcined gypsum, a pozzolan source and a metal salt.

The present inventors have found that adding a combination of a pozzolan source and a metal salt results in a calcium sulphate-based product which maintains its dimensional stability even after heating up to 1000° C. It is thought that a sintering process occurs which binds the gypsum together and helps improve the dimensional stability. Analysis of the product after heating (and after the gypsum has been removed using EDTA) shows that the pozzolan source forms an interlinking network structure which helps to bind the gypsum and thus increase stability. The presence of the metal salt reduces the temperature at which the pozzolan source transforms to the interlinking network structure and allows a reduction in the amount of pozzolan source needed. This may be as a result of the inclusion of the metal salt in the network structure.

The term "pozzolan source" is intended to include materials that are themselves pozzolanic (e.g. fly ash, rice husk ash, diatomaceous earth, volcanic ashes and pumices, microsilica, silica fume) or which yield a pozzolanic material upon heating (e.g. a clay material such as a kaolinitic clay material which yields metakaolin upon heating or silicone oil which yields silica upon heating).

The term "silicone oil" is intended to refer to liquid polysiloxanes. The silicone oil may comprise a polydiorganosiloxane. The organo groups may be alkyl and/or aryl e.g. methyl and/or phenyl groups. An example is polydimethylsiloxane (PDMS). The silicone oil may comprise a polyorganohydrosiloxane. The organo group may be an alkyl or aryl group e.g. a methyl and/or phenyl group. An example is polymethylhydrosiloxane (PMHS). The silicone oil may comprise a copolymer of a diorganosiloxane and an organohydrosiloxane or a blend of a polydiorganosiloxane and a polyorganohydrosiloxane.

The silicone oil may be anhydrous.

Preferably, the pozzolan source is a kaolinitic clay material or diatomaceous earth.

The term "kaolinitic clay material" encompasses kaolinite ($Al_2Si_2O_5(OH)_4$), polymorphs of kaolinite such as dickite, halloysite and nacrite, ball clay (which comprises 20-80% kaolinite, 10-25% mica, 6-65% quartz), fire clay and flint clay. An example of a suitable clay additive is Puroflo 31™ manufactured by Sibelco and which comprises 66% kaolinite, 23% mica, 6% feldspar and 1% quartz. The clay material is preferably an un-calcined clay material. Kaolinitic clay forms the pozzolan metakaolin during dehydration at high temperatures.

In the slurry used to form the calcium sulphate-based product and in the calcium sulphate-based compositions, the pozzolan source may be provided in an amount greater than 5 wt %, preferably between 5 wt % and 30 wt %, more preferably between 5 and 25 wt % e.g. between 5 and 10 wt %, and most preferably between 5 and 9 wt % (where wt % is based on the weight of the calcined gypsum, pozzolan source and metal salt).

In the calcium sulphate-based product, the pozzolan source may be provided in an amount greater than 4 wt %, preferably between 4 and 27 wt %, more preferably between 4 and 20 wt % and most preferably between 4 and 9 wt % (where wt % is based on the weight of the gypsum, pozzolan source and metal salt).

The metal salt is preferably a metal salt which decomposes between a temperature of 300-500° C. to yield a metal oxide.

The metal in the metal salt may be an alkaline earth metal e.g. calcium or magnesium. The metal may be a transition metal e.g. copper, zinc, iron. The metal may be aluminium.

Preferably the metal is magnesium.

The salt may be a nitrate, a carbonate, a hydrogen carbonate, a sulphate, or chloride. The salt may be hydrated.

Preferred metal salts are the nitrates of magnesium, copper, aluminium, calcium, zinc, and iron and magnesium chloride (e.g. the hexahydrate).

In the slurry used to form the calcium sulphate-based product and in the calcium sulphate-based composition, the metal salt may be provided in an amount greater than 1 wt %, preferably between 1 and 15 wt %, more preferably between 1 and 10 wt % and most preferably between 2 and 9 wt %.

The pozzolan source and the metal salt may be included in the slurry and in the calcium-sulphate-based composition in a 1:1 wt % ratio (where wt % is based on the weight of the calcined gypsum, pozzolan source and metal salt). They may each be included in an amount of around 9 or 10 wt %.

In the calcium sulphate-based product, the metal salt may be provided in an amount greater than 0.5 wt %, preferably between 0.5 and 10 wt %, more preferably between 1 and 9 wt % and most preferably between 2 and 9 wt % (where wt % is based on the weight of the gypsum, pozzolan source and metal salt).

The term "gypsum" is intended to refer predominantly to calcium sulphate dihydrate ($CaSO_4.2H_2O$).

The term "calcined gypsum" is intended to refer predominantly to calcium sulphate hemihydrate ($CaSO_4.\frac{1}{2}H_2O$) but may also encompass any other calcium sulphate compound having a lower bound water content than calcium sulphate dihydrate (e.g. calcium sulphate anhydrite).

In the slurry used to form the calcium sulphate-based product and in the calcium sulphate-based composition, the calcined gypsum is preferably provided in an amount between 60 wt % and 95 wt %, more preferably between 75 and 95 wt % and most preferably between 75 and 90 wt % (where wt % is based on the weight of the calcined gypsum, pozzolan source and metal salt).

In the calcium sulphate-based product, the gypsum is preferably provided in an amount between 65 wt % and 98 wt %, more preferably between 65 and 90 wt % and most preferably between 65 and 85 wt % (where wt % is based on the weight of the gypsum, pozzolan source and metal salt).

In a particularly preferred embodiment, the calcium-sulphate based product comprises 65 wt %-98 wt % gypsum, a pozzolan source and 0.5 wt %-9 wt % metal salt and may be formed from drying an aqueous slurry containing 60-95 wt % calcined gypsum, a pozzolan source and 1 wt % to 9 wt % metal salt (where wt % is based on the weight of the gypsum, pozzolan source and metal salt).

For this embodiment, the amounts and nature of the pozzolan source, the preferred amounts of gypsum/calcined gypsum and the preferred amounts/nature of the metal salt may be as described above.

In another particularly preferred embodiment, the calcium-sulphate based product comprises 65 wt %-98 wt % gypsum, a pozzolan source and magnesium nitrate and may be formed from drying an aqueous slurry containing 60-95 wt % calcined gypsum, a pozzolan source and magnesium nitrate (where wt % is based on the weight of the gypsum, pozzolan source and magnesium nitrate).

For this embodiment, the amounts and nature of the pozzolan source, the preferred amounts of gypsum/calcined gypsum and the preferred amounts of the magnesium nitrate may be as described above.

Preferably, the calcium-sulphate-based product contains substantially no vermiculite. The present inventors have found that the addition of a combination of pozzolan source and metal salt can help minimise shrinkage of a calcium-sulphate-based product e.g. gypsum wallboard even in the absence of vermiculite.

In some embodiments, the calcium sulphate-based product contains substantially no inorganic fibres e.g. no glass or asbestos fibres.

However, in some embodiments, the calcium sulphate-based product may contain inorganic fibres (e.g. glass fibres) and/or matting (e.g. glass matting) as this may help improve strength of the product prior to heating.

The calcium sulphate-based product may contain additives such as accelerators, retarders, foaming/anti-foaming agents, fluidisers etc. The accelerators may be, for example, freshly ground gypsum having an additive of sugar or surfactant. Such accelerators may include Ground Mineral NANSA (GMN), heat resistant accelerator (HRA) and ball milled accelerator (BMA). Alternatively, the accelerator may be a chemical additive such as aluminium sulphate, zinc sulphate or potassium sulphate. In certain cases, a mixture of accelerators may be used, e.g. GMN in combination with a sulphate accelerator. As a further alternative, ultrasound may be used to accelerate the setting rate of the slurry, e.g. as described in US2010/0136259.

The term "calcium sulphate-based product" may include building materials such as wallboards (with or without liners) (with or without fibrous reinforcement), tiles (e.g. ceiling tiles), duct encasement panels, joint filler materials (e.g. for joining adjacent wallboards/tiles/panels etc.), plaster compositions or moulds for metal casting.

The term "calcium sulphate-based" will be readily understood as meaning that the product comprises gypsum as a major component i.e. that gypsum is the largest single component in terms of wt % of the product. The term may mean that the product comprises gypsum in 40 wt %, 50 wt %, 60 wt %, 70 wt %, 80 wt %, 90 wt % or greater based on the total weight of the product.

The calcium sulphate-based product may be a composite product e.g. it may be a wallboard having a gypsum matrix core (containing the shrinkage resistance additive) sandwiched between two liners (e.g. paper liners or fibreglass matting).

EXPERIMENTAL

The following examples show products having reduced shrinkage at high temperatures and are given by way of illustration only.

Control Sample 1—No Additives 200 g of calcined gypsum was added to 140 g of water at 40° C. and the mixture was blended by hand for 30 seconds to form a slurry. The slurry was poured into a cylindrical silicone mould (height 25 mm, diameter 12 mm) and the sample was dried at 40° C. overnight (minimum 12 hours).

Control Sample 2—Kaolin (10 wt %)
180 g of calcined gypsum and 20 g of kaolin were dry blended and added to 140 g of water at 40° C. The mixture was blended by hand for 30 seconds to form a slurry. The slurry was poured into a cylindrical silicone mould (height 25 mm, diameter 12 mm) and the sample was dried at 40° C. overnight (minimum 12 hours).

Control sample 3—Kaolin (30 wt %)
140 g of calcined gypsum and 60 g of kaolin were dry blended and added to 140 g of water at 40° C. The mixture was blended by hand for 30 seconds to form a slurry. The slurry was poured into a cylindrical silicone mould (height 25 mm, diameter 12 mm) and the sample was dried at 40° C. overnight (minimum 12 hours).

Control Sample 4—Magnesium Nitrate (9 wt %)
20 g of magnesium nitrate hexahydrate was added to 140 g of water at 40° C. 200 g of calcined gypsum was added to the water/metal salt mixture and the resulting mixture was blended by hand for 30 seconds to form a slurry. The slurry was poured into a cylindrical silicone mould (height 25 mm, diameter 12 mm) and the sample was dried at 40° C. overnight (minimum 12 hours).

Control Sample 5—Copper Nitrate (7 wt %)
16 g of copper nitrate tetrahydrate was added to 140 g of water at 40° C. 200 g of calcined gypsum was added to the water/metal salt mixture and the resulting mixture was blended by hand for 30 seconds to form a slurry. The slurry was poured into a cylindrical silicone mould (height 25 mm, diameter 12 mm) and the sample was dried at 40° C. overnight (minimum 12 hours).

Control Sample 6—Calcium Nitrate (8 wt %)
18 g of calcium nitrate tetrahydrate was added to 140 g of water at 40° C. 200 g of calcined gypsum was added to the water/metal salt mixture and the resulting mixture was blended by hand for 30 seconds to form a slurry. The slurry was poured into a cylindrical silicone mould (height 25 mm, diameter 12 mm) and the sample was dried at 40° C. overnight (minimum 12 hours).

Control Sample 7—Iron Nitrate (9 wt %)
20 g of iron (III) nitrate nonahydrate was added to 140 g of water at 40° C. 200 g of calcined gypsum was added to the water/metal salt mixture and the resulting mixture was blended by hand for 30 seconds to form a slurry. The slurry was poured into a cylindrical silicone mould (height 25 mm, diameter 12 mm) and the sample was dried at 40° C. overnight (minimum 12 hours).

Control Sample 8—Aluminium Nitrate (9 wt %)
20 g of aluminium nitrate nonahydrate was added to 140 g of water at 40° C. 200 g of calcined gypsum was added to the water/metal salt mixture and the resulting mixture was blended by hand for 30 seconds to form a slurry. The slurry was poured into a cylindrical silicone mould (height 25 mm, diameter 12 mm) and the sample was dried at 40° C. overnight (minimum 12 hours).

Control Sample 9—Rice Husk Ash (10 wt %)
180 g of calcined gypsum was dry blended with 20 g of rice husk ash and then blended by hand with 140 g of water for 30 seconds to form a slurry. The slurry was poured into a cylindrical silicone mould (height 25 mm, diameter 12 mm) and the sample was dried at 40° C. overnight (minimum 12 hours).

Control Sample 10—Silicone Oil (10 wt %)
20 g of silicone oil was added to 140 g of water at 40° C. 200 g of calcined gypsum was added to the solution and was blended by hand for 30 seconds to form a slurry. The slurry was poured into a cylindrical silicone mould (height 25 mm, diameter 12 mm) and the sample was dried at 40° C. overnight (minimum 12 hours).

The silicone oil used was SILRES® BS 94 provided by Wacker. This is an anhydrous silicone oil based on polymethylhydrosiloxane.

Control Sample 11—Micro-Silica (10 wt %)
180 g of calcined gypsum was dry blended with 20 g of micro-silica and then blended by hand with 140 g of water for 30 seconds to form a slurry. The slurry was poured into a cylindrical silicone mould (height 25 mm, diameter 12 mm) and the sample was dried at 40° C. overnight (minimum 12 hours).

Control sample 12—Diatomaceous Earth (10 wt %)
180 g of calcined gypsum was dry blended with 20 g of diatomaceous earth and then blended by hand with 140 g of water for 30 seconds to form a slurry. The slurry was poured into a cylindrical silicone mould (height 25 mm, diameter 12 mm) and the sample was dried at 40° C. overnight (minimum 12 hours).

EXAMPLES

Sample formulations having the amounts of metal salt, pozzolan source and calcined gypsum shown in Table 1 below were prepared (for all but Example 23) by mixing the metal salt with 140 g of water at 40° C. The pozzolan source and calcined gypsum were dry blended and added to the water/salt mixture. The resulting mixture was blended by hand for 30 seconds to form a slurry. For example 23, the silicone oil and metal salt were added to 140 g of water at 40° C. and then the calcined gypsum was added to the solution to form a slurry which was blended by hand for 30 seconds. Wt % amounts (based on the dry ingredients) of each component in the slurry are shown below in brackets.

The slurry was poured into a cylindrical silicone mould (height 25 mm, diameter 12 mm) and dried overnight (minimum 12 hours) at 40° C.

TABLE 1

Summary of sample formulations

| Sample | Stucco/g (wt %) | Pozzolan source/g (wt %) | Metal salt/g (wt %) |
|---|---|---|---|
| Control 1 | 200 | 0 | 0 |
| Control 2 | 180 (90) | 20 (10) Kaolin | 0 |
| Control 3 | 140 (70) | 60 (30) Kaolin | 0 |
| Control 4 | 200 (91) | 0 | 20 (9) |
| Control 5 | 200 (93) | 0 | 16 (7) |
| Control 6 | 200 (92) | 0 | 19 (8) |
| Control 7 | 200 (91) | 0 | 20 (9) |
| Control 8 | 200 (91) | 0 | 20 (9) |
| Control 9 | 180 (90) | 20 (10) Rice husk ash | 0 |
| Control 10 | 180 (90) | 20 (10) Silicone oil | 0 |
| Control 11 | 180 (90) | 20 (10) Micro-silica | 0 |
| Control 12 | 180 (90) | 20 (10) Diatomaceous earth | 0 |
| Example 1 Mg nitrate (hexahydrate) | 180 (81.8) | 20 (9.1) Kaolin | 20 (9.1) |
| Example 2 Mg nitrate (hexahydrate) | 140 (63.6) | 60 (27.3) Kaolin | 20 (9.1) |
| Example 3 Mg nitrate (hexahydrate) | 180 (89.1) | 20 (9.9) Kaolin | 2 (1.0) |

TABLE 1-continued

Summary of sample formulations

| Sample | Stucco/g (wt %) | Pozzolan source/g (wt %) | Metal salt/g (wt %) |
|---|---|---|---|
| Example 4 Mg nitrate (hexahydrate) | 195 (96.5) | 5 (2.5) Kaolin | 2 (1.0) |
| Example 5 Mg nitrate (hexahydrate) | 195 (95.1) | 5 (2.4) Kaolin | 5 (2.4) |
| Example 6 Mg nitrate (hexahydrate) | 180 (87.8) | 20 (9.8) Kaolin | 5 (2.4) |
| Example 7 Mg nitrate (hexahydrate) | 190 (92.7) | 10 (4.9) Kaolin | 5 (2.4) |
| Example 8 Cu nitrate (tetrahydrate) | 180 (83.3) | 20 (9.3) Kaolin | 16 (7.4) |
| Example 9 Cu nitrate (tetrahydrate) | 140 (64.8) | 60 (27.8) Kaolin | 16 (7.4) |
| Example 10 Ca nitrate (tetrahydrate) | 180 (82.6) | 20 (9.2) Kaolin | 18 (8.3) |
| Example 11 Ca nitrate (tetrahydrate) | 140 (64.2) | 60 (27.5) Kaolin | 18 (8.3) |
| Example 12 Fe (III) nitrate (nonahydrate) | 180 (81.8) | 20 (9.1) Kaolin | 20 (9.1) |
| Example 13 Fe (III) nitrate (nonahydrate) | 140 (63.6) | 60 (27.3) Kaolin | 20 (9.1) |
| Example 14 Al nitrate (nonahydrate) | 180 (81.8) | 20 (9.1) Kaolin | 20 (9.1) |
| Example 15 Al nitrate (nonahydrate) | 140 (63.6) | 60 (27.3) Kaolin | 20 (9.1) |
| Example 16 Zn nitrate (hexahydrate) | 180 (81.8) | 20 (9.1) Kaolin | 20 (9.1) |
| Example 17 Zn nitrate (hexahydrate) | 140 (63.6) | 60 (27.3) Kaolin | 20 (9.1) |
| Example 18 Mg chloride (hexahydrate) | 180 (89.1) | 20 (9.9) Kaolin | 2 (1.0) |
| Example 19 Mg chloride (hexahydrate) | 195 (96.5) | 5 (2.5) Kaolin | 2 (1.0) |
| Example 20 Mg chloride (hexahydrate) | 195 (95.1) | 5 (2.4) Kaolin | 5 (2.4) |
| Example 21 Mg chloride (hexahydrate) | 180 (87.8) | 20 (9.8) Kaolin | 5 (2.4) |
| Example 22 Mg nitrate (hexahydrate) | 180 (82) | 20 (9) Rice husk ash | 20 (9) |
| Example 23 Mg nitrate (hexahydrate) | 180 (82) | 20 (9) Silicone oil | 20 (9) |
| Example 24 Mg nitrate (hexahydrate) | 180 (82) | 20 (9) Micro-silica | 20 (9) |
| Example 25 Mg nitrate (hexahydrate) | 180 (82) | 20 (9) Diatomaceous earth | 20 (9) |

Linear Shrinkage

Linear shrinkage was measured using a Netzsch dilatometer. The samples were heated to 1000° C. at a rate of 5° C./min. The shrinkage was measured in-situ using a transducer having a resolution of 8 nm.

The dilatometer results are shown in Table 2.

TABLE 2

| Sample | Stucco/wt % in slurry (wt % in product) | Pozzolan source/wt % in slurry (wt % in product) | Metal salt/wt % in slurry (wt % in product) | Shrinkage (%) | | | | |
|---|---|---|---|---|---|---|---|---|
| | | | | 500° C. | 750° C. | 900° C. | 950° C. | 1000° C. |
| Control 1 | 100 | 0 | 0 | −1.8 | −3.6 | −7.13 | −18 | Off scale |
| Control 2 | 90 (91.4) | 10 (8.6) | 0 | −1.59 | −2.50 | −3.10 | −5.11 | −8.03 |
| Control 3 | 70 (73.5) | 30 (26.5) | 0 | −1.6 | −2.7 | −3.46 | −6.48 | −8.59 |
| Control 4 | 91 (92.2) | 0 | 9 (7.8) | −0.02 | −0.12 | −0.17 | −2.84 | −6.51 |
| Control 5 | 93 (93.7) | 0 | 7 (6.3) | −0.24 | −1.54 | −12/9 | Off scale | Off scale |

TABLE 2-continued

| Sample | Stucco/wt % in slurry (wt % in product) | Pozzolan source/wt % in slurry (wt % in product) | Metal salt/wt % in slurry (wt % in product) | Shrinkage (%) 500° C. | 750° C. | 900° C. | 950° C. | 1000° C. |
|---|---|---|---|---|---|---|---|---|
| Control 6 | 92 (92.6) | 0 | 8 (7.4) | −0.26 | −2.84 | −9.05 | −9.08 | −9.1 |
| Control 7 | 91 (92.2) | 0 | 9 (7.8) | −0.6 | −0.7 | −3.6 | −7.7 | −12.3 |
| Control 8 | 91 (92.2) | 0 | 9 (7.8) | −0.7 | −0.4 | −0.4 | −0.9 | −3.5 |
| Control 9 | 90 (91.4) | 10 (8.6) | 0 | −1.7 | −2.6 | −3.5 | −7.7 | −10.4 |
| Control 10 | 90 (91.4) | 10 (8.6) | 0 | −1.3 | −2.2 | −2.4 | −3.2 | −4.6 |
| Control 11 | 90 (91.4) | 10 (8.6) | 0 | −2.0 | −3.4 | −4.8 | −9.4 | −11.7 |
| Control 12 | 90 (91.4) | 10 (8.6) | 0 | −1.8 | −2.6 | −3.5 | −6.2 | −8.5 |
| Ex. 1 Mg(NO$_3$)$_2$ | 81.8 (84.2) | 9.1 (7.9) | 9.1 (7.9) | −0.13 | 0.02 | 0.04 | −0.13 | −0.69 |
| Ex. 2 Mg(NO$_3$)$_2$ | 63.6 (67.5) | 27.3 (24.4) | 9.1 (8.1) | −0.22 | −0.23 | −0.7 | −1.52 | −1.85 |
| Ex. 3 Mg(NO$_3$)$_2$ | 89.1 (90.7) | 9.9 (8.5) | 1.0 (0.8) | −1 | −1.11 | −1.36 | −3.34 | −6.07 |
| Ex. 4 Mg(NO$_3$)$_2$ | 96.5 (97.1) | 2.5 (2.1) | 1.0 (0.8) | −1.25 | −1.41 | −1.42 | −2.19 | −12.4 |
| Ex. 5 Mg(NO$_3$)$_2$ | 95.1 (95.9) | 2.4 (2.1) | 2.4 (2.1) | −0.74 | −0.61 | −0.77 | −1.3 | −12.8 |
| Ex. 6 Mg(NO$_3$)$_2$ | 87.8 (89.5) | 9.8 (8.4) | 2.4 (2.1) | −0.18 | 0.022 | 0.16 | −0.24 | −1.45 |
| Ex. 7 Mg(NO$_3$)$_2$ | 92.7 (93.8) | 4.9 (4.2) | 2.4 (2.1) | −0.32 | −0.068 | 0.13 | −0.39 | −6.95 |
| Ex. 8 Cu(NO$_3$)$_2$ | 83.3 (85.6) | 9.3 (8.0) | 7.4 (6.4) | −0.19 | −0.03 | −0.29 | −0.04 | −1.49 |
| Ex. 9 Cu(NO$_3$)$_2$ | 64.8 (68.6) | 27.8 (24.8) | 7.4 (6.6) | −0.47 | −0.38 | −0.52 | −0.99 | −1.5 |
| Ex. 10 Ca(NO$_3$)$_2$ | 82.6 (84.9) | 9.2 (8.0) | 8.3 (7.2) | −0.3 | −0.01 | −0.3 | −0.24 | −0.72 |
| Ex. 11 Ca(NO$_3$)$_2$ | 64.2 (68.0) | 27.5 (24.6) | 8.3 (7.4) | −0.49 | −0.52 | −0.04 | −0.52 | −1.01 |
| Ex. 12 Fe(NO$_3$)$_3$ | 81.8 (84.2) | 9.1 (7.9) | 9.1 (7.9) | −0.75 | −0.64 | −0.92 | −1.0 | −1.42 |
| Ex. 13 Fe(NO$_3$)$_3$ | 63.6 (67.5) | 27.3 (24.4) | 9.1 (8.1) | −0.47 | −0.34 | −0.42 | −0.68 | −0.99 |
| Ex. 14 Al(NO$_3$)$_3$ | 81.8 (84.2) | 9.1 (7.9) | 9.1 (7.9) | −0.78 | −0.5 | −0.32 | −0.3 | −0.36 |
| Ex. 15 Al(NO$_3$)$_3$ | 63.6 (67.5) | 27.3 (24.4) | 9.1 (8.1) | −0.82 | −0.93 | −0.79 | −0.80 | −0.79 |
| Ex. 16 Zn(NO$_3$)$_2$ | 81.8 (84.2) | 9.1 (7.9) | 9.1 (7.9) | −0.47 | −0.31 | −0.86 | −2.07 | −4.43 |
| Ex. 17 Zn(NO$_3$)$_2$ | 63.6 (67.5) | 27.3 (24.4) | 9.1 (8.1) | −0.05 | 0.1 | −0.07 | −0.6 | −0.87 |
| Ex. 18 MgCl$_2$ | 89.1 (90.7) | 9.9 (8.5) | 1.0 (0.8) | −0.5 | −0.4 | −0.07 | −1.2 | −1.4 |
| Ex. 19 MgCl$_2$ | 96.5 (97.1) | 2.5 (2.1) | 1.0 (0.8) | −0.58 | −0.63 | −2.64 | −7.4 | −8.69 |
| Ex. 20 MgCl$_2$ | 95.1 (95.9) | 2.4 (2.1) | 2.4 (2.1) | −0.49 | −1.45 | −5.51 | −8.89 | −10.61 |
| Ex. 21 MgCl$_2$ | 87.8 (89.5) | 9.8 (8.4) | 2.4 (2.1) | −0.3 | −0.3 | −0.5 | −0.1 | −0.1 |
| Ex. 22 Mg(NO$_3$)$_2$ | 82 (84.2) | 9 (7.9) | 9 (7.9) | −0.04 | −0.04 | −0.15 | −1.85 | −4.23 |
| Ex. 23 Mg(NO$_3$)$_2$ | 82 (84.2) | 9 (7.9) | 9 (7.9) | −0.95 | −1.42 | −1.38 | −1.52 | −1.95 |
| Ex. 24 Mg(NO$_3$)$_2$ | 82 (84.2) | 9 (7.9) | 9 (7.9) | −0.41 | −0.31 | −0.2 | −0.7 | −8.8 |
| Ex. 25 Mg(NO$_3$)$_2$ | 82 (84.2) | 9 (7.9) | 9 (7.9) | −0.03 | −0.01 | −0.02 | −0.07 | −1.92 |

The results show that a combination of pozzolan source and a metal salt can help reduce shrinkage after exposure to elevated temperatures. Results are most pronounced when greater than 5 wt % of pozzolan source is used in the slurry (greater than 4 wt % in the product) and when greater than 1 wt % metal salt is used in the slurry (greater than 0.5 wt % in the product). Results where an equal amount of pozzolan source and metal salt are used are particularly pronounced.

The invention claimed is:
1. A gypsum wallboard comprising:
gypsum, a pozzolan source, and a metal salt, wherein:
the gypsum is provided in an amount of 40% or greater based on a total weight of the gypsum wallboard,
the metal salt is selected from nitrate and hydrogen carbonate salts of calcium, magnesium, copper, zinc, iron and aluminum, and carbonate and chloride salts of copper, zinc, iron or aluminum; and the metal salt is provided in an amount of between 0.5 wt % and 10 wt % based on the weight of the gypsum, the pozzolan source and the metal salt.

2. The gypsum wallboard according to claim 1, wherein the pozzolan source is included in an amount between 4 wt % and 27 wt % (based on the weight of the gypsum, the pozzolan source and the metal salt).

3. The gypsum wallboard according to claim 1, wherein the wt % of pozzolan source and wt % metal salt are equal.

4. The gypsum wallboard according to claim 1, wherein the pozzolan source is selected from a kaolinitic clay material, fly ash, rice husk ash, diatomaceous earths, volcanic ashes and pumices, micro-silica, silica fume and silicone oil.

5. The gypsum wallboard according to claim 1, wherein the metal salt decomposes between a temperature of 300° C.-500° C. to yield a metal oxide.

6. The gypsum wallboard according to claim 1, wherein the metal salt is a magnesium salt.

7. A gypsum wallboard formed by a process comprising:
drying an aqueous slurry containing gypsum, a pozzolan source, and a metal salt additive, wherein:
the gypsum is provided in the gypsum wallboard in an amount of 40% or greater based on a total weight of the gypsum, the pozzolan source and the metal salt additive,
the metal salt additive is selected from nitrate and hydrogen carbonate salts of calcium, magnesium, copper, zinc, iron and aluminum and carbonate and chloride salts of copper, zinc, iron or aluminum, and
the metal salt additive is included in the slurry in an amount between 1 wt % and 15 wt %.

8. The gypsum wallboard according to claim 7, wherein the pozzolan source is included in the slurry in an amount between 5 wt % and 30 wt %.

9. A calcium sulphate-based composition for use in forming a gypsum wallboard by drying an aqueous slurry of the calcium sulphate-based composition, the calcium sulphate-based composition comprising:
gypsum, a pozzolan source, and a metal salt, wherein:
the gypsum is provided in the gypsum wallboard in an amount of 40% or greater based on a total weight of the gypsum wallboard,
the metal salt is selected from nitrate and hydrogen carbonate salts of calcium, magnesium, copper, zinc, iron and aluminum and carbonate and chloride salts of copper, zinc, iron or aluminum, and
the metal salt is included in the slurry in an amount between 1 wt % and 15 wt %.

10. The calcium sulphate-based composition according to claim 9, wherein the pozzolan source is included in an amount between 5 wt % and 30 wt %.

11. The calcium sulphate-based composition according to claim 9, wherein the wt % of pozzolan source and wt % metal salt are equal.

12. The calcium sulphate-based composition according to claim 9, wherein the pozzolan source is selected from a kaolinitic clay material, fly ash, rice husk ash, diatomaceous earths, volcanic ashes and pumices, micro-silica, silica fume and silicone oil.

13. The calcium sulphate-based composition according to claim 9, wherein the metal salt decomposes between a temperature of 300° C.-500° C. to yield a metal oxide.

14. The calcium sulphate-based composition according to claim 13, wherein the metal salt is a magnesium salt.

15. A method of forming a gypsum wallboard by drying an aqueous slurry comprising the composition according to claim 9.

16. A gypsum wallboard comprising:
gypsum, a pozzolan source, and a metal salt additive, wherein:
the gypsum is provided in an amount of 40% or greater based on a total weight of the gypsum wallboard,
the metal salt additive is selected from calcium nitrate and salts of magnesium, copper, zinc, or iron, and
the wt % of pozzolan source and wt % metal salt additive are equal.

17. The gypsum wallboard according to claim 16, wherein the pozzolan source is selected from a kaolinitic clay material, fly ash, rice husk ash, diatomaceous earths, volcanic ashes and pumices, micro-silica, silica fume and silicone oil.

18. The gypsum wallboard according to claim 16, wherein the metal salt decomposes between a temperature of 300-500° C. to yield a metal oxide.

19. The gypsum wallboard according to claim 18, wherein the metal salt is a magnesium salt.

* * * * *